United States Patent Office.

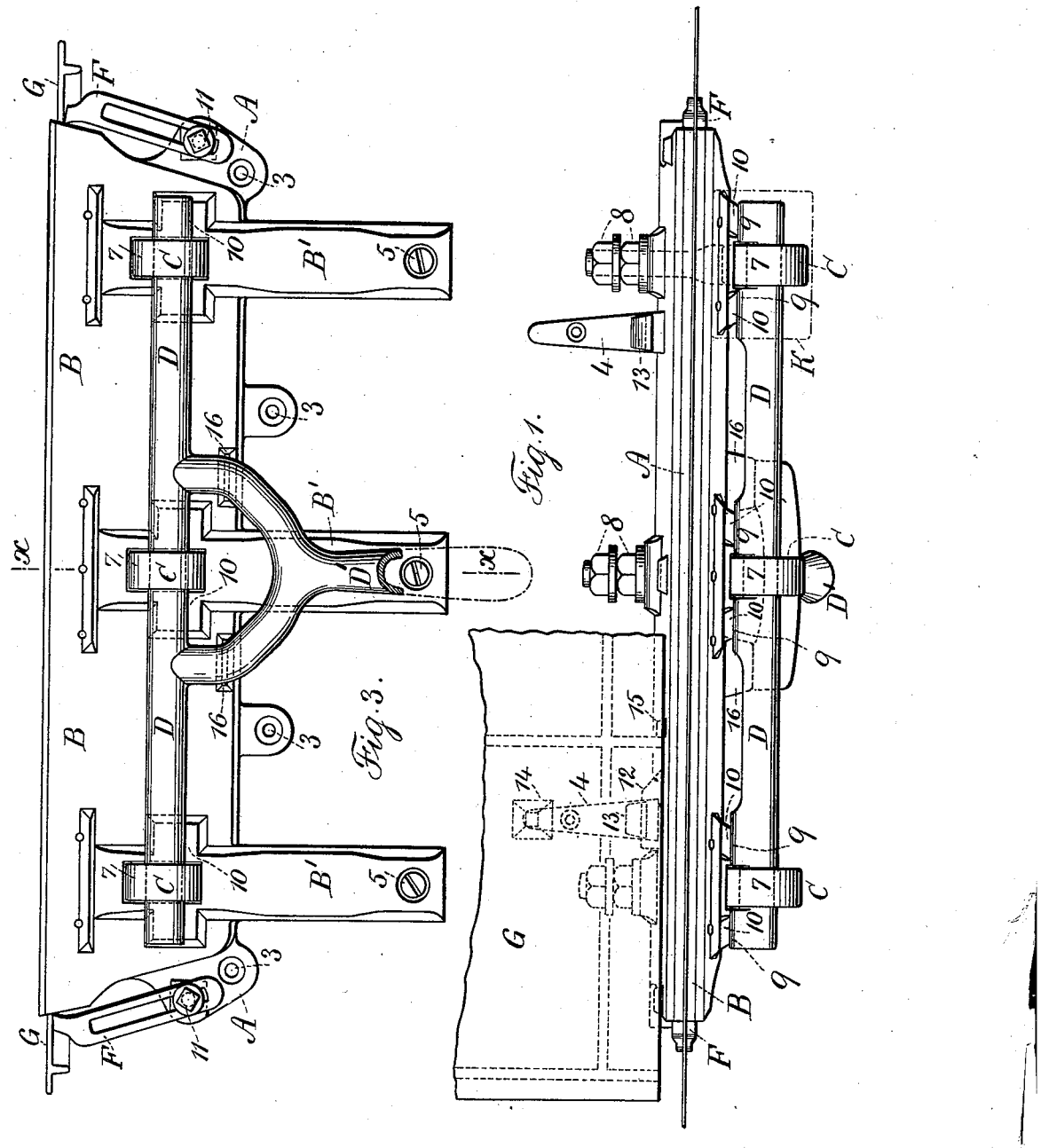

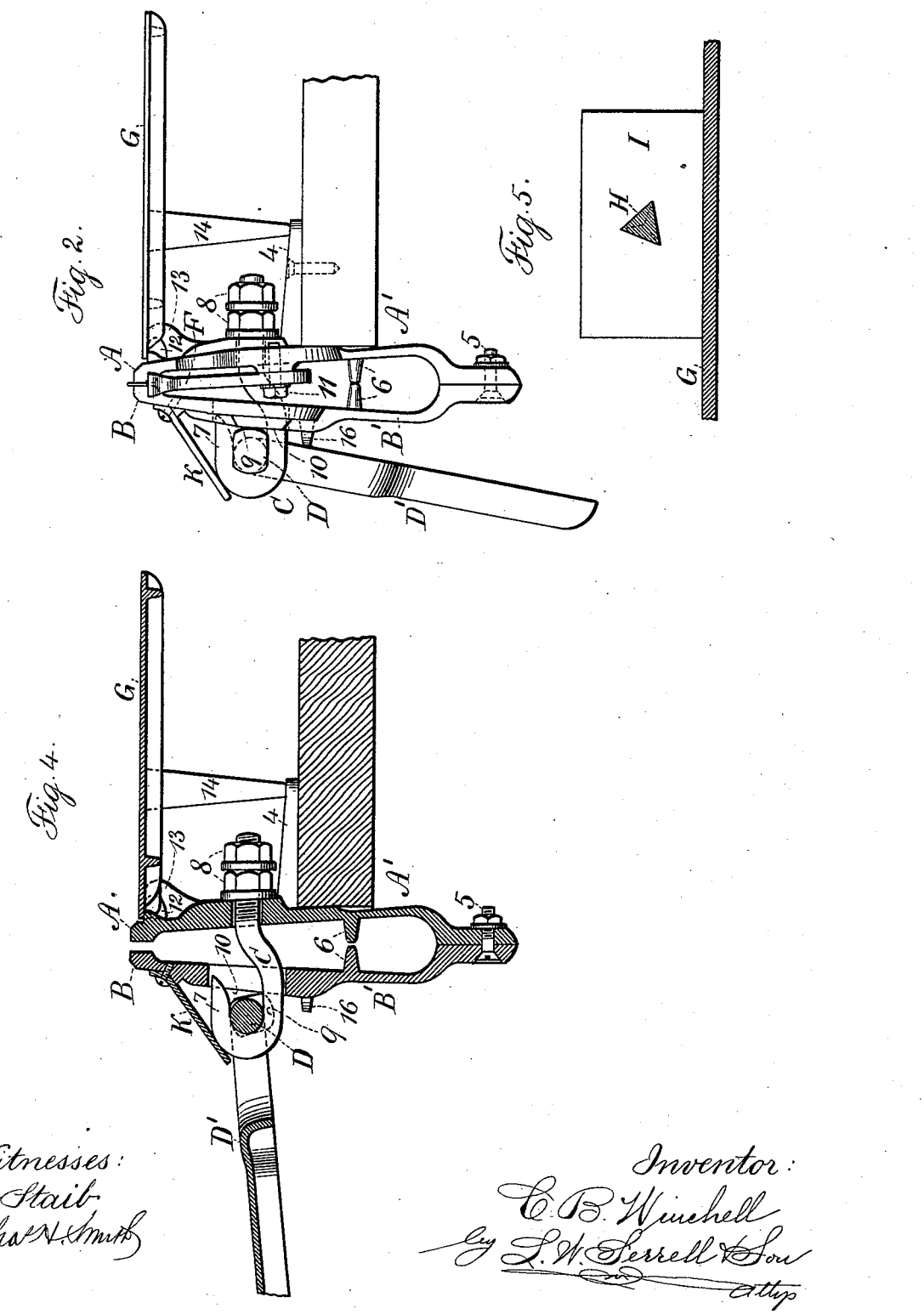

CHARLES B. WINCHELL, OF NEW YORK, N. Y., ASSIGNOR TO WINCHELL & HUTCHINSON, OF SAME PLACE.

BAND-SAW CLAMP AND FILING-GUIDE.

SPECIFICATION forming part of Letters Patent No. 602,205, dated April 12, 1898.

Application filed March 29, 1897. Serial No. 629,667. (No model.)

*To all whom it may concern:*

Be it known that I, CHARLES B. WINCHELL, a citizen of the United States, residing in the city, county, and State of New York, have invented an Improvement in Band-Saw Clamps and Filing-Guides, of which the following is a specification.

The present improvement is especially intended for filing band-saws, but it may be used in filing other saws having the teeth in a straight line.

The object of the present invention is to apply a uniform pressure along the entire length of the clamping-jaws, so as to hold the saw as firmly at one place as at another, and to adjust the clamping devices for different thicknesses of saws. I also provide a file-guide in the form of a table adapted to receive a guide-block upon the end of the file, whereby great accuracy in the filing of the teeth is insured, because the table and the guide-block insure parallelism in the movement of the file across the saw and lessen the risk of inaccurate filing by an inexperienced or careless person.

In the drawings, Figure 1 is a plan view of the saw-clamp and a portion of the table forming the file-guide. Fig. 2 is an end view. Fig. 3 is an elevation, and Fig. 4 is a cross-section at the line $xx$, and Fig. 5 shows a file in section and a guide-block for the same.

The front jaw B and back jaw A are preferably of cast-iron or steel and of a suitable length and width according to the character of the saw to be received between the upper edge portions, which advantageously are made as ribs to grasp the saw at its opposite sides, and, according to the length of the jaws, so I provide two or more spring-legs upon each of the jaws. I have represented three spring-legs A' extending downward from the back jaw A and three similar legs B' extending down from the front jaw B, and these legs terminate at the bottom ends as perforated plates, through which the bolts 5 pass to firmly connect the respective legs together. The distance that the jaws open for the reception of the saw being comparatively little these legs A' and B' spring sufficiently even when made of cast-iron or steel for opening such jaws, and when they are forced together the springs yield, and there are stops 6 upon the inner portions of the respective jaws and opposite to each other and above the spring-legs, so that the power to grip the saw is not resisted by the spring-legs, but by the stops 6 coming together.

In order to support the apparatus, any suitable flanges or brackets may be provided. I have shown the flanges 4 as adapted to rest upon the surface of a bench, and there are holes at 3, near the bottom edge of the back jaw A, through which screws may pass for connecting such back jaw to a bench or table.

In closing the jaws I make use of clamp-bolts, a cam-shaft, and a lever-handle. The length of the cam-shaft corresponds, or nearly so, to the length of the jaws, and, according to the size of the apparatus, so two, three, or more clamp-bolts may be made use of. I have represented three clamp-bolts C as passing through openings in the jaws and provided with lock-nuts 8 at their back ends, and the cam-shaft D passes through the front ends of such clamp-bolts, and upon the cam-shaft D are double cams, one at each side of each clamp-bolt, such cams acting against the bearing-surfaces 10 upon the front jaw B, and the handle D' is provided for giving a turning motion to the cam-shaft in closing the jaws upon the saw.

In consequence of the cam-shaft D being cylindrical where it passes through each clamp-bolt C and the cam projection D being at each side of the clamp-bolt a more extended bearing is taken by the cams upon the front jaw and there is little risk of either bending or springing the cam-shaft or acting unequally upon the jaw, as there is in clamps where the cam is only at one side of the clamp-bolt. It is generally advantageous to employ three of these clamp-bolts, as shown, and to insure uniformity in the movement of the cam-shaft by the handle D' it is advantageous to place that handle D' in the middle of the cam-shaft and to fork the same, so as to pass at each side of the central clamp-bolt C. Hence if the clamp-bolt was simply made with an eye for the reception of the cam-shaft the parts could not be put together. I therefore make a clamp-bolt with a hook end 7, so that this hook end can receive the circular portion of the cam-shaft, with the cams 9, one at each side of the clamp-bolt, and with the fork of the handle extending out from the cam-shaft at each side of the cams, and it is advantageous to make all three of the clamp-bolts with hook ends, so that they will be uniform and can be easily inserted into place and receive the cam-shaft into them previous to such clamp-bolts being screwed up, and it is advantageous in adjusting the apparatus to place a saw or saw-blade in position between the jaws, depress the handle D', and then screw up the nuts 8 to give the proper holding force of the jaws upon the saw, and then by raising the handle the saw will be liberated, and by depressing such handle the saw will be again grasped with great uniformity throughout the entire length of the jaws.

I find it advantageous to make use of end guides F at the ends of the jaws for the back of the saw to rest upon such guides, and these guides are slotted, and the screws 11 pass into the back jaw near its ends for holding these guides F in the positions to which they may be raised or lowered. These guides insure uniformity in the position of the saw in relation to the jaws and allow the saw to be drawn along endwise from time to time as it is sharpened.

The utility of a saw depends largely upon the uniformity in shape of the saw-teeth and their accurate alinement, and many persons in filing a saw fail to move the file horizontally, and hence the surface filed instead of being flat is often rounding. To aid the saw-filer in properly manipulating his file, I provide a guide-table G, which advantageously is level, or nearly so, and of a width corresponding, or nearly so, to the length of the file, and this table G has upon its under edge, next to the back jaw, A lugs 12, which pass into and are engaged by hooks 13 upon the back of the back jaw A, and there are legs 14 beneath the table G for supporting the same, which legs advantageously rest upon the supporting-flanges 4. Hence this table can be connected or disconnected by an end movement to connect the lugs 12 to the hooks 13, or the reverse, and these lugs 12 may be tapered, if desired, and the stop 15 is advantageously provided upon the back jaw A for engaging a cross rib or projection upon the under side of the table G to limit the movement in connecting the table to the jaw.

The operator after having introduced his saw between the jaws and clamped the same by swinging the handle D' downward and turning the cam-shaft makes use of a file of any suitable character. I have represented the triangular file at H, and a guide-block I is applied at the end of this file, there being a hole or recess in the guide-block for receiving the end of the file, and the position of this hole and the size of the guide-block are such that the file will be parallel, or nearly so, to the surface of the guide-table G as such file is moved backward and forward in filing the teeth, and during this operation the block I slides freely upon the surface of the table, and the table is not injured by the file or the file by the table, as is the case where the file comes directly into contact with the guide, and when making use of the triangular file the same can be inserted into a hole in the guide-block and driven thereinto in such a way that the angles of the file will be at the proper inclination to the surface of the guide-table as the file is made use of in filing either the front or back of the teeth, and it will be apparent that different guide-blocks can be provided, if necessary, one for the file that is used in filing the front of the tooth and the other for the file employed in filing the back of the tooth, so that the guide-block need not be changed upon the files during the entire filing operation on the saw. Hence great uniformity in the shape and positions of the teeth can be obtained.

Of course it is to be understood that the character of the file and of the guide-block will vary according to the shape or size of the tooth to [be filed, and the table G is available as a guide for the file whether the file be used at right angles to the saw or at a greater or less inclination horizontally. Stops may be provided at 16 to limit the downward movement of the handle D' in turning the cam-shaft.

It is disadvantageous for saw-filings to pass in between the cams on the cam-shaft and the bearing-surfaces upon the jaws, and to prevent this occurring caps or covers may be provided, as shown at K, which are advantageously of leather and fastened at their upper ends to the outer surface of the front jaw B, and they project sufficient to keep the saw-filings from contact with the cams or bearing-surfaces. In Fig. 1 the dotted lines at K illustrate the position of one of these caps, such caps being removed to allow the other parts to be shown more clearly.

I claim as my invention—

1. The jaws A and B having integral spring-legs extending down and means for connecting them together at the lower ends and stops projecting at the inner sides of the jaws and coming into contact when pressure is applied to the jaws, so as to relieve the spring-legs from strain, substantially as set forth.

2. The combination with the jaws A and B, of a clamp-bolt passing through the jaws, a nut upon the rear end of the clamp-bolt, the outer end of the clamp-bolt being formed as a hook, a shaft perpendicular to the bolt and passing through the hook and parallel with the jaws, a lever and cams integral with the shaft, the cams being one at each side of the hook of the bolt and acting upon the surface of the front jaw, substantially as specified.

3. The combination with the jaws A and B, of a clamp-bolt passing through the jaws, a nut upon the rear end of such clamp-bolt, the outer end of the clamp-bolt being formed as a hook, a cam-shaft passing through the hook of the clamp-bolt and having cams one at each side of such clamp-bolt and a handle forked and extending out from the cam-shaft near each of the cams, substantially as set forth.

4. The stationary jaw A and movable front jaw B, in combination with the clamp-bolts passing through the jaws and having nuts upon their inner ends and formed as hooks upon their outer ends, a cam-shaft passing through the hooks of the clamp-bolts and having cams at each side of each bolt, there being projecting bearing-surfaces upon the front jaw for engaging the cams and a handle for turning the cam-shaft, substantially as set forth.

Signed by me this 16th day of March, 1897.

C. B. WINCHELL.

Witnesses:
   GEO. T. PINCKNEY,
   E. E. POHLÉ.